(12) United States Patent
Fahlgren et al.

(10) Patent No.: US 6,195,253 B1
(45) Date of Patent: Feb. 27, 2001

(54) SUBSTATION

(75) Inventors: Erik Fahlgren; Lars Hjort, both of Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 09/355,950

(22) PCT Filed: Feb. 9, 1998

(86) PCT No.: PCT/SE98/00221

§ 371 Date: Sep. 14, 1999

§ 102(e) Date: Sep. 14, 1999

(87) PCT Pub. No.: WO98/36480

PCT Pub. Date: Aug. 20, 1998

(30) Foreign Application Priority Data

Feb. 12, 1997 (SE) .................................. 9700496

(51) Int. Cl.[7] .................................................. H02B 5/04
(52) U.S. Cl. .................. 361/603; 361/601; 361/602; 361/611; 361/620; 361/622; 361/623; 361/641; 307/147; 200/48 R; 200/48 A

(58) Field of Search ...................... 361/603, 675, 361/611, 601–602, 622, 641, 688, 690, 618, 643–648, 620–623, 683; 307/147; 200/48 R, 48 A

(56) References Cited

U.S. PATENT DOCUMENTS 5,648,888 * 7/1997 Francois et al. ...................... 361/603

FOREIGN PATENT DOCUMENTS

| 41 39 177 | 6/1992 | (DE) . |
| 2 579 031 | 9/1986 | (FR) . |
| 916391 | 1/1963 | (GB) . |
| WO 97/24789 | 7/1997 | (WO) . |

* cited by examiner

Primary Examiner—Gregory Thompson
Assistant Examiner—Michael Datskovsky
(74) Attorney, Agent, or Firm—Oblon, Spivak, McClelland, Maier & Neustadt, P.C.

(57) ABSTRACT

A substation for high voltage switching and a method of building the same. The substation includes an air-insulated high voltage switchgear station, a transformer and a medium voltage switchgear station. The high voltage switchgear station is arranged inside of a building.

20 Claims, 6 Drawing Sheets

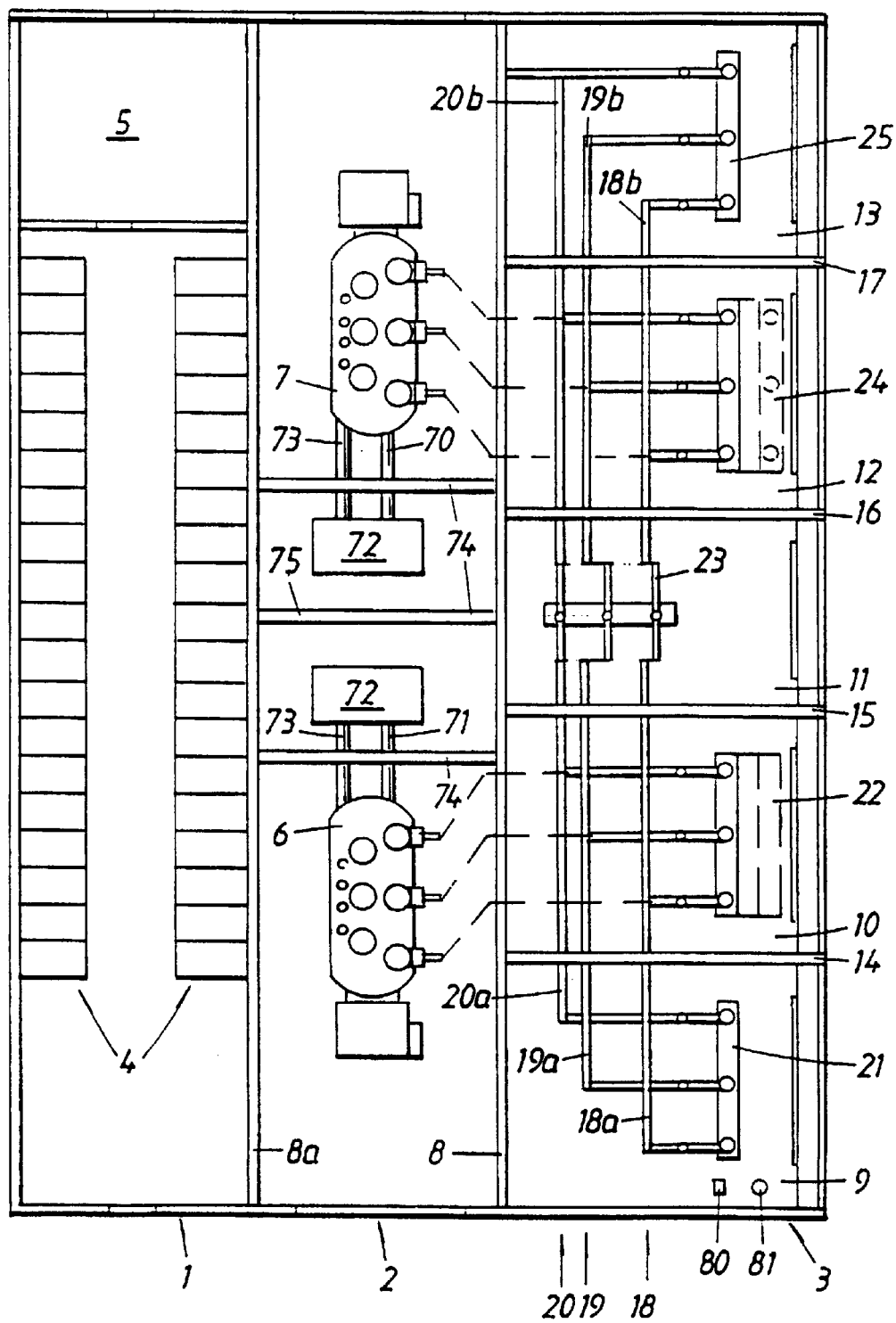

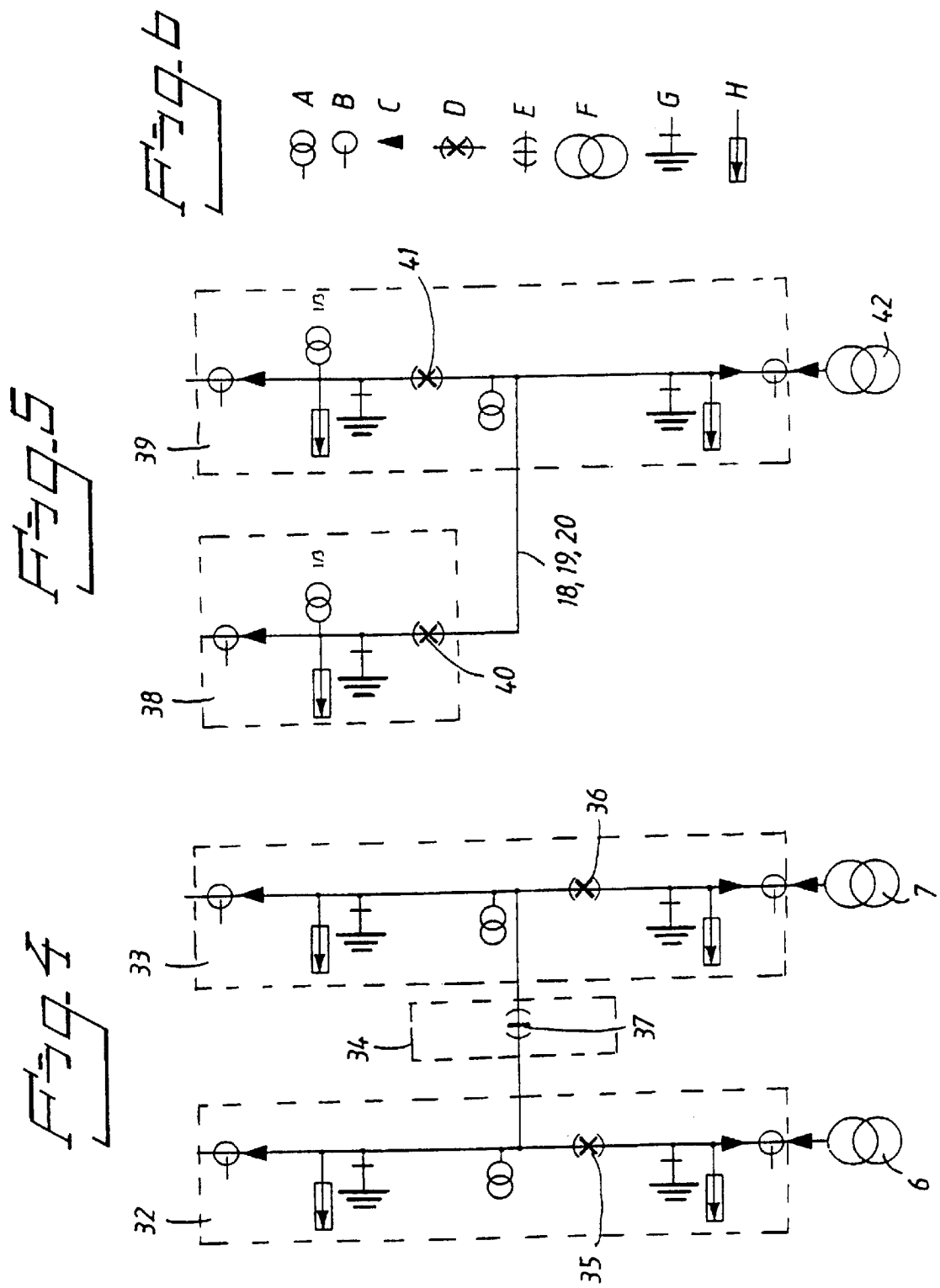

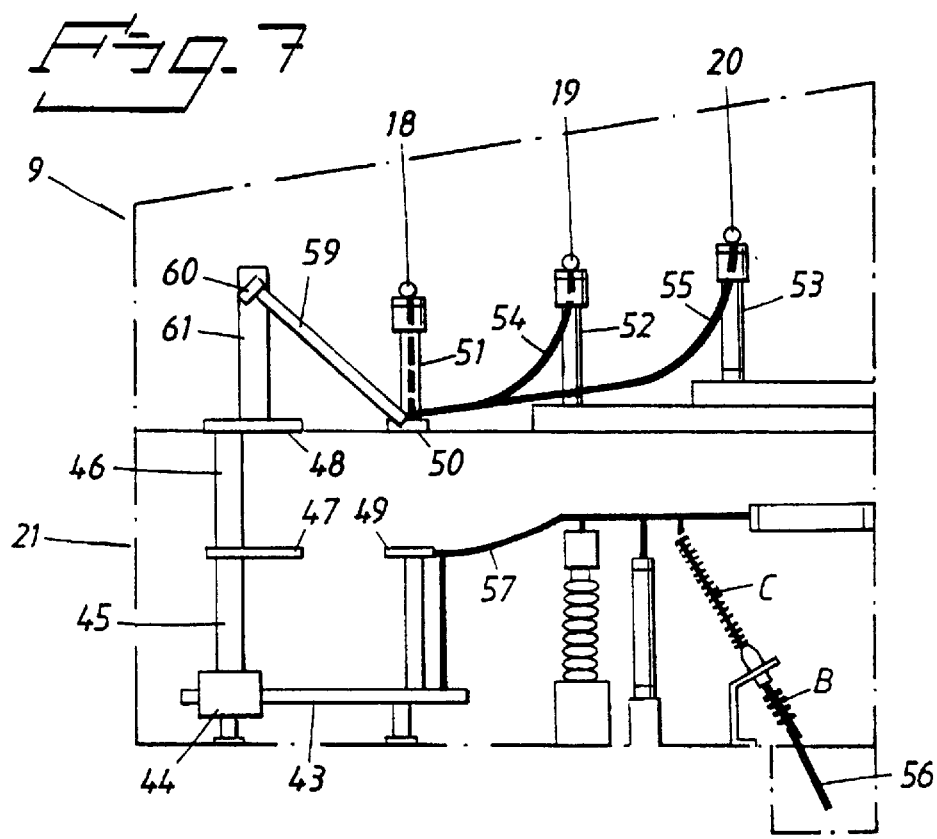
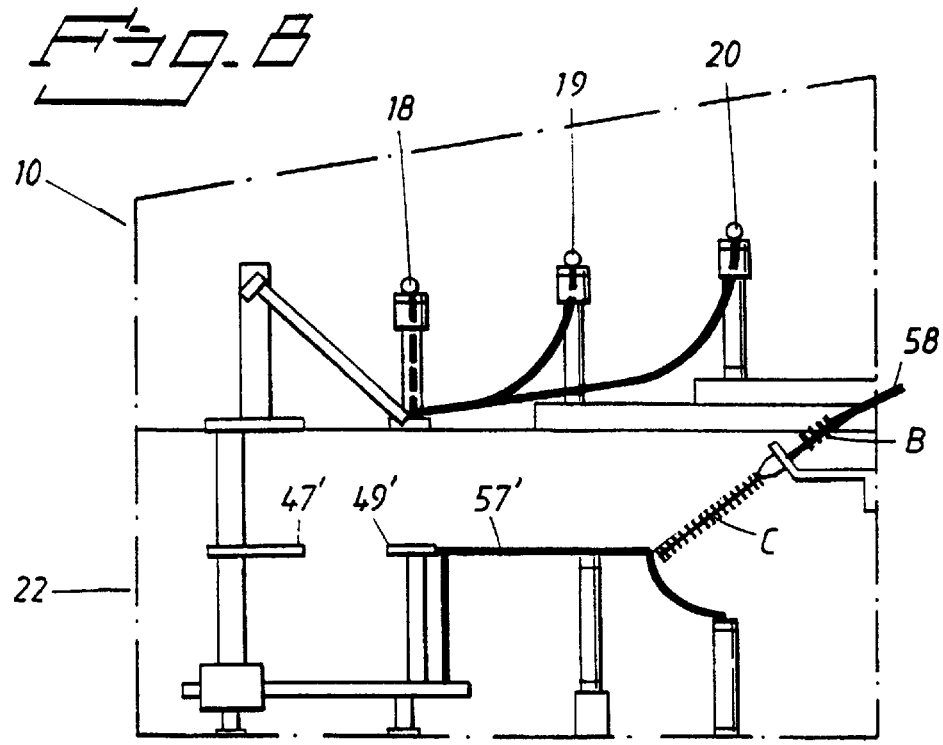

SUBSTATION

BACKGROUND OF THE INVENTION

1. Field of the Invention

The present invention relates to a substation of the type defined in the preamble to claim 1, and to a method of the type described in the preamble to claim 18.

2. Discussion of the Background

Conventional switchgear stations for high voltage are generally placed outdoors and take a considerable amount of space. The switchgear station is assembled on site and the components connected together. In view of its size and, in the eyes of many people, its unsightly appearance, these have generally had to be located far from residential districts and other areas frequented by people. They are therefore often located far from built-up areas. In many cases this results in undesired restriction of their localisation. Besides which, the construction of a switchgear station on site is relatively costly.

Since many towns have expanded over the years and existing substations which, at the time they were built, were situated outside the built-up area, are often now in the middle of the urban area. Environmental and space problems are thus encountered when such a station has served its time and is to be re-built.

In the present patent application the concept of high voltage relates to a voltage level of 52 kV and upwards, preferably up to 145 kV.

In an attempt to achieve more compact substations it is already known to enclose the substation components in hermetically sealed gas containers, with the components surrounded by $SF_6$-gas. The gas causes increased resistance to flashover, thus enabling t h e requirements for a safe distance between components at different voltage levels to be reduced so that a more compact manner of construction is possible. However, enclosing the components in such gas containers is extremely expensive. The gas enclosures must also be monitored for leakage risks, which further increases operating costs.

Substations with gas-insulated switchgear stations are therefore complicated, take a long time to repair after a fault, and complicate any extension with additional compartments, particularly after a long time when it may be difficult to obtain spare parts. The service life of a substation is approximately 30 years.

To avoid the drawbacks associated with substations in the open air and with substations surrounded by gas, it is also already known to enclose parts of the substation in a building in an environment of air. Examples of this can be found in SU 1,798,845, SU 801,166, FR 2,579,031, GB 916,391 and DE 4,139,177.

Both the SU publications show how the components in a switchgear station are enclosed in a building cell. This design results in extremely high buildings, approximately 20 meter, and the station must be supplied with overhead lines. Nothing is indicated as to how the other components in a substation including the building cell are arranged.

FR 2,579,031 shows a substation in which the high-voltage switchgear station is arranged in an air-insulated building constituting several floors. The supply lines are overhead lines. The transformers are situated outside the building.

GB 916,391 shows how a substation for lower voltages is housed in a building with aluminium walls.

DE 4,139,177 shows how the high-voltage switchgear station in a substation is arranged in a building constituting several floors. The switchgear station is supplied by overhead lines. How other parts of the substation are designed is not revealed.

The known examples in which parts of an air-insulated substation are enclosed in a building enable the drawbacks associated with substations in the open air or substations surrounded by gas to be avoided to a certain extent. However, none of the arrangements described above fully offers the opportunity to arrange an air-insulated substation at high voltage which is compact, service-friendly and which causes minimal disturbance so that it can be situated in an urban environment without problem.

SUMMARY OF THE INVENTION

In the light of this, the object of the present invention is to provide a substation for high voltage of the type under consideration, which will meet these demands.

According to the invention this is achieved by a substation of the type described in the preamble to claim 1 having the special features defined in the characterizing part of this claim.

Thanks to the section with the transformers means also being enclosed in a building and, what is more, in the same closed building as the high-voltage switchgear station, the entire substation will be screened from the outer environment in order to reduce any disturbance it might cause. At the same time, an extremely compact arrangement is possible which further contributes to the feasibility of placing the station in a built-up area. Since the section with the high-voltage switchgear station is provided with outer walls permitting access to its compartments through doors in the outer wall, servicing is possible without having to arrange special service routes inside the building between the transformer section and the high-voltage switchgear station section. The transformer section and the high-voltage switchgear station section can therefore be located directly adjacent to each other, which contributes to reducing the size of the station. The ground cable connection is another feature that makes the station suitable for built-up areas.

Thanks to the compact structure according to the invention, the ground area required can thus be reduced from approximately 2400 $m^2$ to less than 600 $m^2$ for a typical substation with 145 kV on the high-voltage side.

In a preferred version of this embodiment the building is made in three sections, with fireproof partitions between them, the middle section housing the substation's transformers and the high-voltage switchgear station section being located on one side and the medium-voltage switchgear station section on the other side. Optimal use is thus also made of the space while at the same time suppressing the sound emission from the transformers to the surroundings.

The high-voltage switchgear station of the substation is suitably divided by partition walls defining compartments containing components for all three phases so that an economic and space-saving design is achieved.

In various preferred embodiments the compartments comprise line compartments, transformer compartments, combination compartments and sectioning compartments in advantageous combinations depending on the application. The compartments are suitably provided with doors allowing access from outside.

It is advantageous to use truck breakers in the compartments and to arrange the busbars inside the building.

The above and other advantageous embodiments of the substation according to the invention are defined in the claims dependent on claim 1.

A second aspect of the invention relates to a method of building or converting such a substation. Such a method is defined in claim 18.

BRIEF DESCRIPTION OF THE DRAWINGS

The invention is explained in more detail in the following description of preferred embodiments thereof, with reference to the accompanying drawings, in which FIG. 1 is a view from above of a substation according to the invention, FIG. 7 is a side view of a line compartment according to the invention, FIG. 8 is a side view of a transformer compartment according to the invention.

DETAILED DESCRIPTION OF THE PREFERRED EMBODIMENTS

Figure 3:
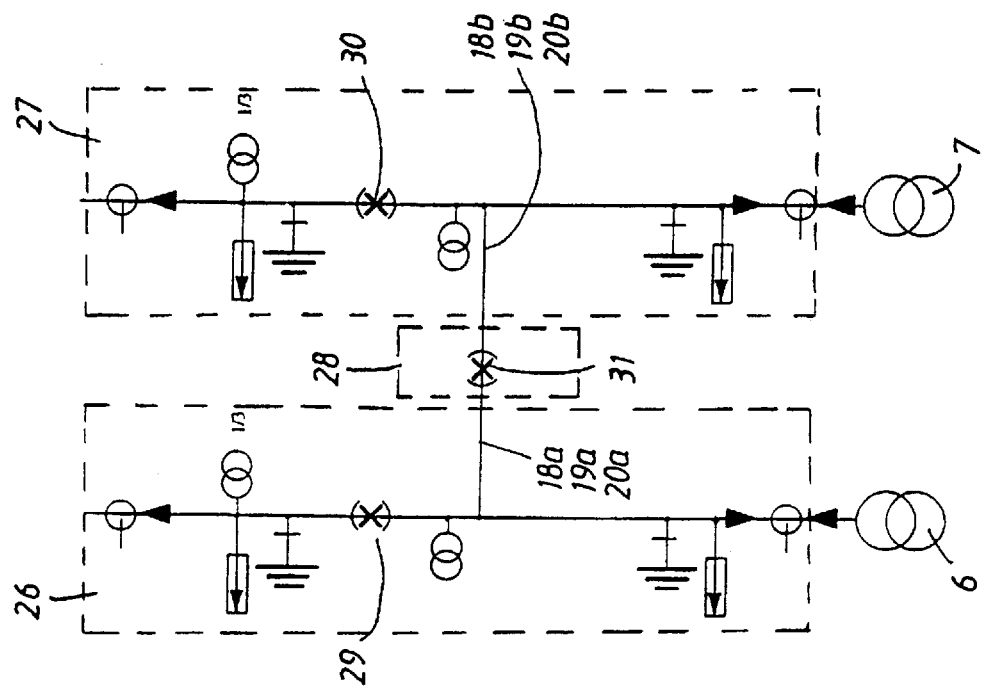

FIG. 1 shows a schematic bird's-eye view of the substation according to one embodiment of the invention. The substation is housed in a building divided into three sections comprising a first section 1 in which the medium-voltage switchgear station 4 of the substation is housed, a second section 2 in which two transformers 6, 7 are housed, and a third section 3 in which the high-voltage switchgear station is housed. The building is approximately 30 m long, approximately 20 m wide and maximally about 7.5 m high. The three sections 1, 2 and 3 are separated by walls 8, 8a which, like the partition walls 75 and the outside walls, are fireproof. The substation has a voltage of 145 kV on the high-voltage side and 12/24 kV on the medium-voltage side.

The two transformers 6, 7 are oil-cooled and approximately 90% of the thermal output of 200 kW generated by the transformers is therefore cooled off and can be utilized. The remaining 10% is cooled by ventilation. Each transformer 6, 7 is connected by pipes 70, 71 to a heat exchanger 72 which, via a return pipe 73, returns cooled oil to the transformers 6 and 7.

The walls 74 seal from the ceiling down to about 1.5 from the floor. The opening thus formed enables a fan to withdraw air from the transformer space up through the heat exchanger and out into the open air.

The high-voltage switchgear station section 3 is divided into five compartments 9–13 arranged in a row and separated by walls 14–17.

The two outer compartments 9, 13 are line compartments, connected to in-coming high-voltage lines which are ground cables. Inside each line compartment 3, 9 is a transformer compartment 10, 12, connected to the transformers 6, 7, respectively. The middle compartment is a sectioning compartment 11, arranged to divide the high-voltage switchgear station into two sections.

The high-voltage switchgear station is air-insulated and each compartment services all three phases. The busbars 18, 19, 20 of the high-voltage switchgear station are divided by the sectioning compartment into two sections 18a; 18b, 19a; 19b, 20a; 20b and run inside the building. The walls 14, 15, 16, 17 in the high-voltage switchgear station do not reach right up to the ceiling of the building. The busbars are arranged above these walls.

A three-pole truck breaker 21 is arranged in the line compartment 9, with the busbar contacts situated immediately above the corresponding contacts to the in-coming line. Voltage and current transformers, surge diverter, cable connection and ground contact are also arranged in the compartment. Compartment 13 is identical, with a truck breaker 25.

The transformer compartments 10, 12 are equipped in substantially the same manner but do not contain any voltage transformers. The lower contacts of the truck breakers 22 and 24, respectively, are here connected to counter contacts connected to respective transformers 6, 7.

The sectioning compartment 17 includes a truck isolator 23 by means of which the sectioning can be achieved.

In an alternative embodiment the line compartment 9 and transformer compartment 10 can be combined to a combination compartment, in which case the partition 14 is of course omitted. Similarly, a combination compartment can be formed of the compartments 12 and 13. Such a combination compartment will be longer than one of the compartments 9 or 10 but shorter than their combined length. Only one truck breaker is required in the combination compartment and in can be arranged in one of two different ways—either between the line and the busbars, in which case the busbars are connected directly to the transformer connection, or between the busbar and the transformer connection, in which case the busbars are connected directly to the line. In the former case the truck isolator 23 in the sectioning compartment 11 is replaced with a truck breaker.

In applications using only one transformer in the substation and two incoming lines, the high-voltage switchgear station sectioning compartment and one of the transformer compartments are omitted. The other may be designed as a combination compartment with one line, the combination compartment then suitably being designed with truck breaker to the line and direct connection to the transformer. Such a high-voltage switchgear station thus has only two compartments, a line compartment and a combination compartment.

A controllable video camera 80 may be arranged in each of the compartments to enable monitoring.

The compartments may also be provided with PD monitors 81 (Partial Discharge) in order to detect partial discharges in the air (Corona) when the field strength becomes too great.

These occur in air around certain corners of high-voltage components and are unfavourable since they cause losses, radio disturbance and the production of ozone. PD monitoring provides more complete electric control of the high-voltage equipment, thus allowing trends to be analysed and shut-downs and the need for servicing to be predicted.

FIGS. 2–5 show circuit diagrams for the alternatives described above and FIG. 6 is a list of symbols to facilitate understanding of FIGS. 2–5.

Figure 2:
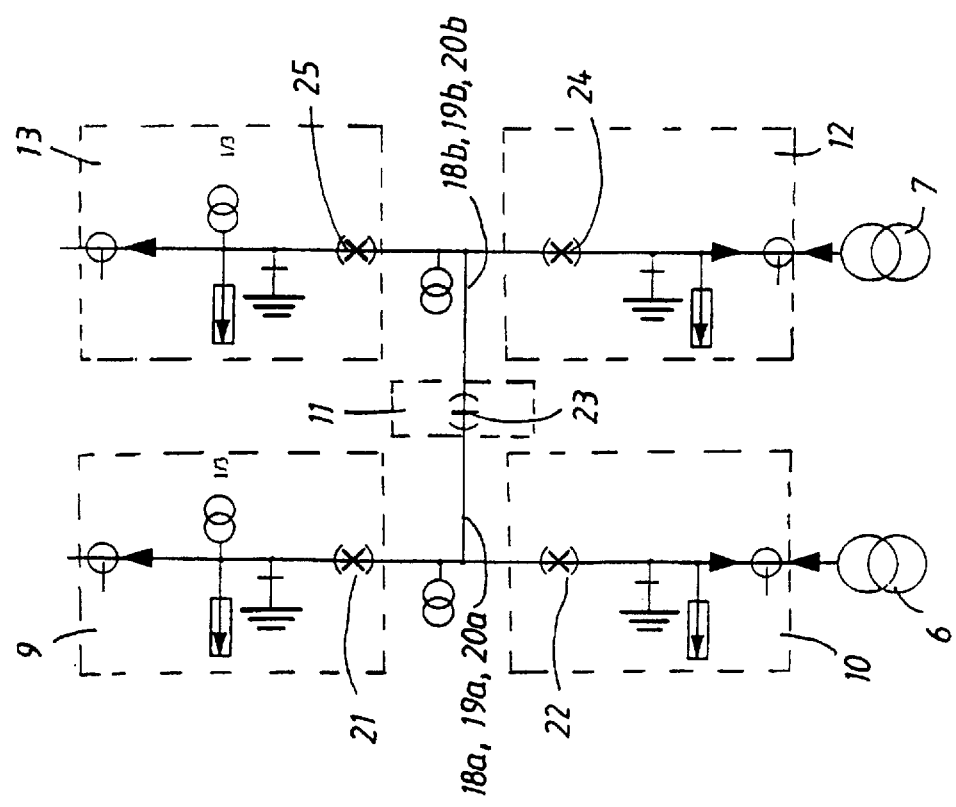
FIG. 2 is a symbol diagram of the high-voltage switchgear station in FIG. 1, FIGS. 3–5 show diagrams corresponding to FIG. 2 of alternative embodiments of the high-voltage switchgear station, FIG. 6 explains the symbols used in FIGS. 2–5.

FIG. 2 represents the embodiment illustrated in FIG. 1 with two line compartments 9, 11 having truck breakers 21, 25, two transformer compartments 10, 12 connected to respective transformers 6, 7, and the sectioning compartment 13 with truck isolator 23 by means of which the two parts of the switchgear station can be joined together when the isolator 23 connects the busbar sections 18a, 19a, 20a and 18b, 19b, 20b, respectively, with each other or sectioned when the isolator 23 disconnects them. The diagram also reveals other components in the switchgear station, such as voltage and current transformers, cable connections, ground contacts and surge arresters, reference being made to the list of symbols in FIG. 6.

FIGS. 3 and 4 show the two alternatives with combination compartments for the line and transformer equipment. In FIG. 3 the truck breaker of the combination compartment 26, 30 is arranged between line and busbar 18a, 19a, 20a and 18b, 19b, 20b, respectively, while the transformers 6, 7 are directly connected. The sectioning compartment 31 is here provided with a truck breaker 31. FIG. 4 differs from the embodiment in FIG. 3 in that the truck breakers 35, 36 are instead placed on the transformer side.

FIG. 5 illustrates the embodiment with a line compartment 38 and a combination compartment 39, the latter having the truck breaker 41 on the line side. The compartments 38, 39 are closed the whole time by means of the busbars 18, 19, 20 and, depending on the position of the breakers 40, 41, the transformer 42 is supplied from either one or both lines.

In the symbol diagram in FIG. 6 A=voltage transformer, B=current transformer, C=cable connection, D=truck breaker, E=truck isolator, F=power transformer, G=ground contact and H=surge arrester.

Figure 9:
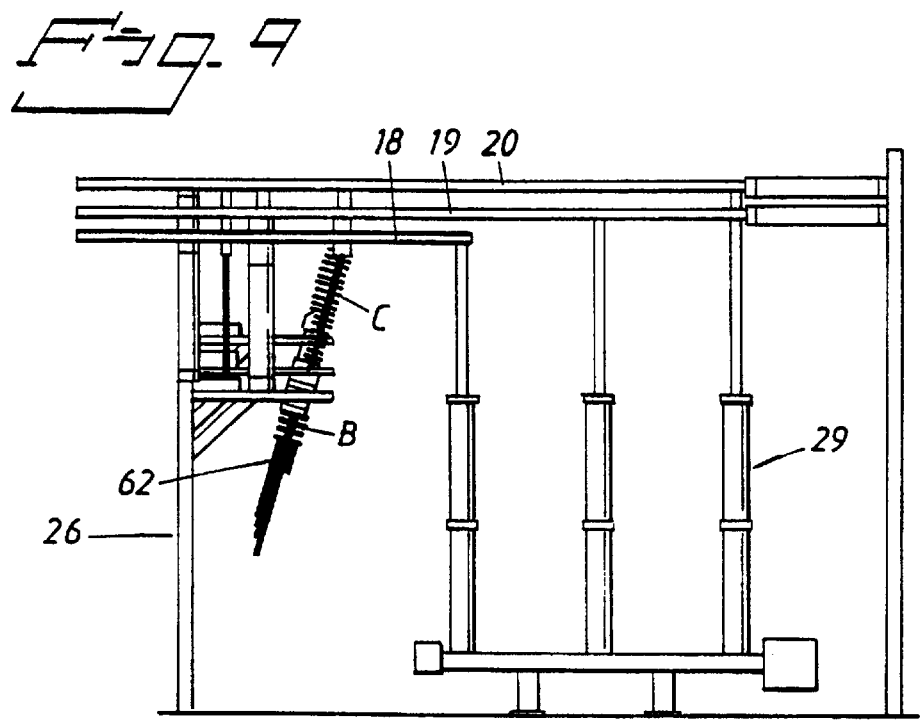
FIG. 9 is an end view of a combination compartment according to the invention.
Figure 10:
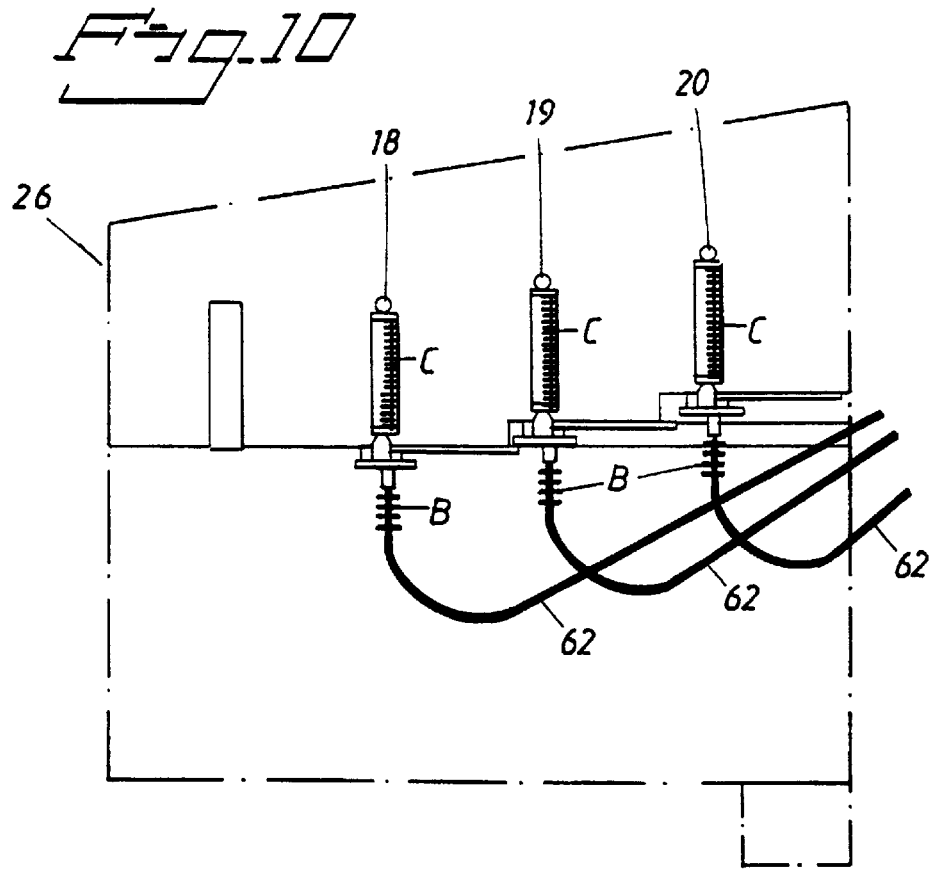
FIG. 10 is a detail of a side view of the compartment in FIG. 9.

FIGS. 7–13 illustrate schematically examples of embodiments of various types of compartments. FIG. 7 is a line compartment, FIG. 8 is a transformer compartment, FIGS. 9 and 10 show a combination compartment and FIGS. 11 and 12 a sectioning compartment.

The line compartment in FIG. 7 is equivalent to the compartment 9 in FIGS. 1 and 2 and is provided with a three-pole truck breaker 21. The truck breaker consists of a unit movable on a stand with the aid of profiled wheels running on rails in the stand 43. The travelling movement is achieved by means of an operating unit 44. The truck breaker is provided with three columns arranged side by side in a plane at right angles to the plane of the Figure so that only one of them is visible in the Figure and the other two are hidden behind it. Each column consists of a lower pin insulator 45 and an upper pin insulator 46, each lower pin insulator being provided with a lower contact 47 to one phase each and arranged for connection to a counter contact 49 from the line. Similarly, each upper pin insulator 46 is provided with an upper contact 48 for connection to a counter contact 50 on each busbar. The counter contacts 50 are supported by pin insulators 59 extending downwards from a supporting beam 60 running at right angles to the plane of the paper and carried by a column 61 at each side wall of the compartment. The busbars 18, 19, 20, situated at different levels with a difference in level of approximately 300 mm, are supported by pin insulators 51, 52 and 53, respectively, and are connected to the counter-contacts via conductors, only the conductors 54, 55 to the two rear busbars 19, 20 being visible in the Figure. Incoming cable 56 from the line is connected via current transformer B, cable connection C and a conductor 57 to respective counter-contact 49. The truck breaker is shown in its OFF position in the Figure. The current path is connected by the truck breaker travelling to the right in the Figure, whereupon the size pairs of contacts 47, 49 and 48, 50 are simultaneously closed so that the current is conducted from the incoming cable 56 up to respective busbars 18, 19, 20.

FIG. 8 shows a corresponding view of a transformer compartment 10. The truck breaker 22 is of the same type is in FIG. 7 for the line compartment and its connection to the busbars 18, 19, 20 is identical. The lower contacts 47' of the truck breaker 22 cooperate here with counter-contacts 49' to conductors 57' connected to the cables 58 to the transformer, via cable connection C and current transformer B. Unlike incoming cables 56 in FIG. 7, the transformer cables 58 are directed upwards to fit the outputs on the transformer. When the truck breaker 22 is moved to its ON position, the current from the incoming busbars from the line compartment will be conducted via the truck breaker to the transformer.

The combination compartment 26 in FIGS. 9 and 10 is shown in FIG. 9 in an end view, i.e. a view perpendicular to that of the line and transformer compartments shown in FIGS. 7 and 8. The combination compartment is of the type illustrated in FIG. 3, i.e. with switching between line and busbars. For a description of the truck breaker 29 in the combination compartment in FIG. 9, therefore, reference is made to the description of the truck breaker in the line compartment in FIG. 7. Each transformer cable 62 is directly connected via current transformer B and cable connection C with respective busbars 18, 19, 20. The connection between line and transformer is thus connected and disconnected in this case by means of a single truck breaker.

Figure 11:
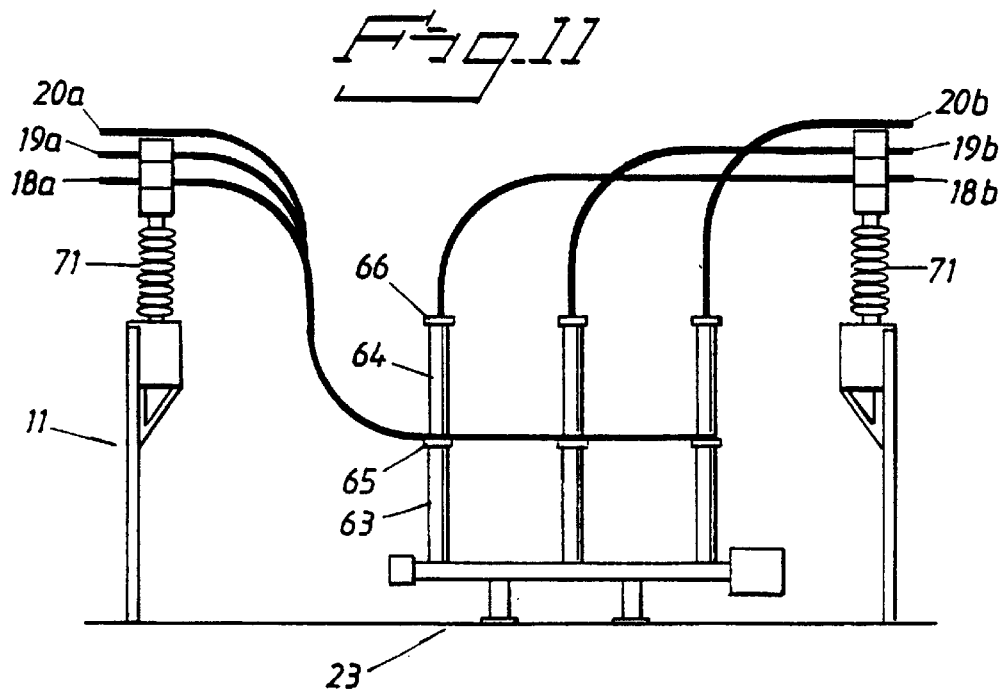
FIG. 11 is an end view of a sectioning compartment according to the invention.
Figure 12:
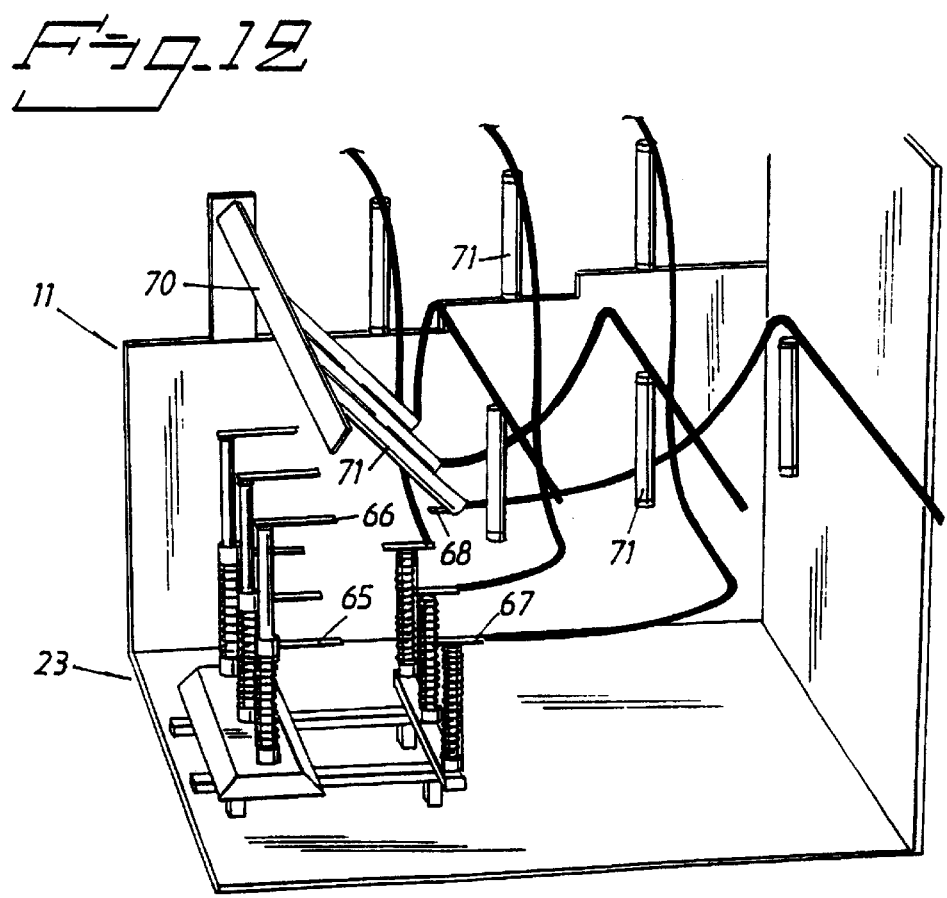
FIG. 12 is a perspective view of the compartment in FIG. 11.

The sectioning compartment 11 with its truck isolator 23 (see FIGS. 1 and 2) is illustrated in FIGS. 11 and 12. The truck is of a similar type to that of the truck breaker in FIGS. 7–10 except that the breaker has been replaced with short-circuit plate. The three columns here consist of a pin insulator 63 at the bottom and a conducting pillar 64 placed on top as an extension thereof. At the upper end of each pin insulator 63 is a contact 65 for connection to a corresponding counter-contact 67 to each busbar 18a, 19a, 20a and, similarly, at the upper end of each conductor 64 is a contact 66 for connection to the contacts 68 on the other sections 18b, 19b, 20b of the busbars.

The counter-contacts for the first sections 18a, 19a, 20a of the busbars are supported by pin insulators 69 directed upwardly from the truck stand, and the counter-contacts 68 for the other sections 18b, 19b, 20b by pin insulators 71 directed obliquely downwards from a supporting beam 70 arranged in an upper portion of the compartment. The busbar sections are supported by pin insulators close to the side walls of the compartment. In its OFF position the switchgear station is divided into two sections and in its ON position it will be connected to form one unit.

What is claimed is:

1. A substation for high voltage comprising:
  a first section including a medium-voltage switchgear station;
  a second section including an air-insulated high-voltage switchgear station; and
  a third section including one or more transformers, wherein
    the second section is arranged as part of a closed building constituting one floor and includes a plurality of compartments separated by walls, and further wherein
    at least the third section is housed with the second section as part of the building and has one side abutting the third section via a fireproof partition wall inside the building and has an opposite side provided as an outer wall of the building, said outer wall having doors for access to said compartments, and further wherein supply lines of the substation are ground cables.

2. The substation as claimed in claim 1, wherein all said sections are arranged as part of the building with partition walls between each section, said building further housing a control unit.

3. The substation as claimed in claim 2, wherein the first section houses the control unit, the third section is located between the two other sections, and all of the sections are separated from each other by fireproof partition walls.

4. The substation as claimed in any claims 1–3, wherein said one or more transformers in said third section are mostly oil-cooled and, to a lesser extent, air-cooled.

5. The substation as claimed in claim 4, wherein oil cooling, elements are arranged to recover heat carried away by the oil.

6. The substation as claimed in any of claims 1–3, wherein each compartment houses electrical equipment for all three phases of a three-phase line.

7. The substation as claimed in claim 6, wherein said compartments include a first and a second line compartment and a transformer compartment.

8. The substation as claimed in claim 6, wherein said compartments include a line compartment and at least one combined line/transformer compartment.

9. The substation as claimed in claim 8, wherein said compartments include a sectioning compartment and two combined line/transformer compartments.

10. The substation as claimed in any of claims 1–3, wherein said compartments include an additional transformer compartment.

11. The substation as claimed in claim 10, wherein said compartments include a sectioning compartment.

12. The substation as claimed in any of claims 1–3, wherein said compartments are arranged in a row along the third section.

13. The substation as claimed in any of claims 1–3, wherein the air-insulated high-voltage switchgear station is provided with aluminum pipe busbars arranged inside the building.

14. The substation as claimed in any of claims 1–3, wherein the air-insulated high-voltage switchgear station includes truck breakers (21).

15. The substation as claimed in any of claims 1–3, wherein the one or more transformers in the third section are connected to the truck breakers by wall lead-ins.

16. The substation as claimed in any of claims 1–3, wherein controllable video cameras are provided for monitoring.

17. The substation as claimed in any of claims 1–3, wherein monitors are arranged to monitor partial discharges therein.

18. A method of building or converting a substation for high voltage comprising:

providing a first section as a medium-voltage switchgear station;

providing a second section as an air-insulated high-voltage switchgear station; and providing a third section including one or more transformers, wherein the step of providing the second section includes arranging the second section inside a closed building on one floor and further includes providing the second section with a plurality of compartments separated by walls, and further wherein at least the step of providing the third section is performed so that the third section is also housed in the building with the second section so that one side of the second section abuts against the third section via a fireproof partition wall and an opposite side of the second section acts as an outer wall of the building, said outer wall being provided with doors for access to said compartments, and further connecting the substation to ground cables.

19. The method as claimed in claim 18, wherein the substation is built or converted in such a way as to be provided the equipment in accordance with any of claims 1–3.

20. A substation as claimed in claim 1, wherein the high voltage is above 145 kV.

* * * * *